(12) United States Patent
Klein (10) Patent No.: US 7,460,672 B2
(45) Date of Patent: Dec. 2, 2008

(54) METHOD FOR SECURING DATA STORAGE IN A STORAGE AREA NETWORK

(75) Inventor: Yaron Klein, Ra'anana (IL)

(73) Assignee: Sanrad, Ltd., Tel Aviv (IL)

( * ) Notice: Subject to any disclaimer, the term of this patent is extended or adjusted under 35 U.S.C. 154(b) by 593 days.

(21) Appl. No.: 10/891,390

(22) Filed: Jul. 14, 2004

(65) Prior Publication Data

US 2005/0013441 A1 Jan. 20, 2005

Related U.S. Application Data (60) Provisional application No. 60/488,711, filed on Jul. 18, 2003.

(51) Int. Cl.
*H04L 9/00* (2006.01)
*H04K 1/00* (2006.01)
*G06F 1/00* (2006.01)
*G06F 12/14* (2006.01)
*G06F 11/30* (2006.01)

(52) U.S. Cl. .................. 380/278; 380/28; 713/165; 713/167

(58) Field of Classification Search ................. 380/278, 380/28; 713/165, 167
See application file for complete search history.

(56) References Cited

U.S. PATENT DOCUMENTS

| | | | |
|---|---|---|---|
| 5,247,575 A | 9/1993 | Sprague et al. | |
| 5,479,514 A | 12/1995 | Klonowski | |
| 5,483,596 A | 1/1996 | Rosenow et al. | |
| 5,630,057 A | 5/1997 | Hait | |
| 5,931,947 A | 8/1999 | Burns et al. | |
| 5,991,401 A | 11/1999 | Daniels et al. | |
| 6,058,476 A | 5/2000 | Matsuzaki et al. | |
| 6,263,445 B1 | 7/2001 | Blumenau | |
| 7,143,288 B2 * | 11/2006 | Pham et al. | ................. 713/165 |
| 2003/0105830 A1 | 6/2003 | Pham et al. | |
| 2003/0115337 A1 | 6/2003 | Jayam et al. | |
| 2003/0115447 A1 | 6/2003 | Pham et al. | |
| 2005/0080761 A1 * | 4/2005 | Sundarajan et al. | ............ 707/1 |

FOREIGN PATENT DOCUMENTS

WO WO 9604599 A1 * 2/1996

OTHER PUBLICATIONS

Srivaths Ravi, Anand Raghunathan, Nachiketh Potlapally, Murugan Sankaradass, "System Design Methodologies for a Wireless Security Processing Platform", Jun. 2002, DAC '02: Proceedings of the 39th conference on Design automation, pp. 777-782.*

* cited by examiner

*Primary Examiner*—Matthew Smithers
*Assistant Examiner*—Courtney D Fields
(74) *Attorney, Agent, or Firm*—Myers Wolin, LLC (57) ABSTRACT

Disclosed is a device and method for securing stored data in an IP based storage area network (SAN), where the physical storage media is located in an unprotected site. The connection between the client and the unprotected site is established over a public or private IP network preferably by means of an iSCSI protocol. According to the present invention a data block to be saved in a remote site is encrypted at the initiator host using a private encryption key and an encrypt key. The private encryption key is saved in a key management table which is shared among other hosts that may access the encrypted data block.

43 Claims, 5 Drawing Sheets

New Physical location = FUN (Original location, Key)

FIGURE 5 ated to the small computer
METHOD FOR SECURING DATA STORAGE IN A STORAGE AREA NETWORK This application claims priority to U.S. provisional patent application Ser. No. 60/488,711 filed on Jul. 18, 2003, which application is incorporated herein in its entirety by this reference thereto.

TECHNICAL FIELD

The present invention relates generally to the protection of stored data in a remote and unsafe location and, more particularly, to encryption of data in an iSCSI based SAN.

BACKGROUND OF THE INVENTION

Nowadays the need for distributed data storage, particularly in connection with the access of enterprise data, is becoming widely accepted. Distributed data storage can be flexibly architected enabling global access to data, data redundancy, geographically distributed data storage, and remote backup. One implementation that greatly facilitated the broad use of distributed data storage systems is a storage area network (SAN). A SAN is often used to centralize the management and maintenance of storage resources within organizations of various sizes or by third-party storage service providers (SSPs).

Network devices such as conventional network server systems and dedicated storage appliances, are used as the architectural building blocks of distributed data storage systems. Many of these devices implement support for the internet small computer system interface (iSCSI) protocol to obtain reliable data storage transport over a conventional TCP/IP network. The iSCSI protocol is described in the IETF Internet Draft iSCSI standard and is incorporated herein by reference. The iSCSI protocol itself encapsulates an I/O storage command and data structure that conforms to the small computer system interface (SCSI) architecture model (SAM2). While the SAM2 defines a local, direct attach client-server data transport protocol, the iSCSI protocol encapsulation of SAM2 adds global network naming support for initiator-target communication between network connected data source (i.e., initiator) and terminal storage (i.e., target) devices. Specifically, the iSCSI protocol allows network devices that are not connected by the same SCSI bus to communicate with each other over the Internet.

However, there are a number of practical and architectural problems inherent to the conventional distributed data storage systems. Data security and control over the security management functions are typically recognized as the most significant problems requiring resolution. The data security problems involve issues such as transport security, access security, and storage security.

Transport security is concerned with ensuring that data is delivered between an initiator client and a target storage device without external monitoring. The iSCSI protocol anticipates the complementary use of conventional transport security protocols, such as IP security (IPsec) protocol or other proprietary protocols, to provide secure encryption for data while being transported over the network. However, these protocols do not provide storage security. Conventionally, data delivered to a destination site for storage is protected at the destination site only by the security practices of that destination site. Typically, destination security is implemented by physical site security and locally administered encryption of the data. Such security means are neither guaranteed nor nominally within the control of the source data owner.

In the related art, there are a few solutions attempt to secure data store at the SSP sites. However, these solutions do not secure the data over the SAN. For example, U.S. patent application Ser. No. 10/016,879 entitled "Network Media Access Architecture and Methods for Secure Storage" (hereinafter the "'879 application") discloses a network controller for managing secure data storage in SSP sites. The provided controller encrypts data transmitted from a client to a storage device located at the SSP site. The data is encrypted according to a predefined encryption key that is associated with the target storage device. That is, the network controller does not associate the encryption key with the initiator, and thus the initiator is not aware which encryption key was used to encrypt the transmitted data. Furthermore, the network controller disclosed in the '879 application does not provide any means to encrypt data transmitted from the initiator. Therefore, data sent from an initiator to a target storage device is not secure while traveling the path between the initiator and the network controller.

It would be therefore advantageous to provide improved techniques to secure data transmitted over a storage network.

SUMMARY OF THE INVENTION

A device and method for securing stored data in an IP based storage area network (SAN), where the physical storage media is located in an unprotected site. The connection between the client and the unprotected site is established over a public or private IP network preferably by means of an iSCSI protocol. Accordingly a data block to be saved in a remote site is encrypted at the initiator host using a private encryption key and an encrypt key. The private encryption key is saved in a key management table which is shared among other hosts that may access the encrypted data block.

Also described is a method for securing data by performing block level encryption including: receiving a write command from an initiator host, the write command including at least a data block and a location in a storage device into where the block is to be written to; encrypting the data block using a private encryption key; saving the private encryption key associated with the data block in a key management table (KMT); and, distributing the private encryption key to other hosts having an access to the data block. The method may also include saving the encrypted data block in a storage device to the location designated in the write command. The encrypted data block is transmitted from the initiator host to the storage device over a distributed storage network.

DETAILED DESCRIPTION OF THE INVENTION

Figure 1:
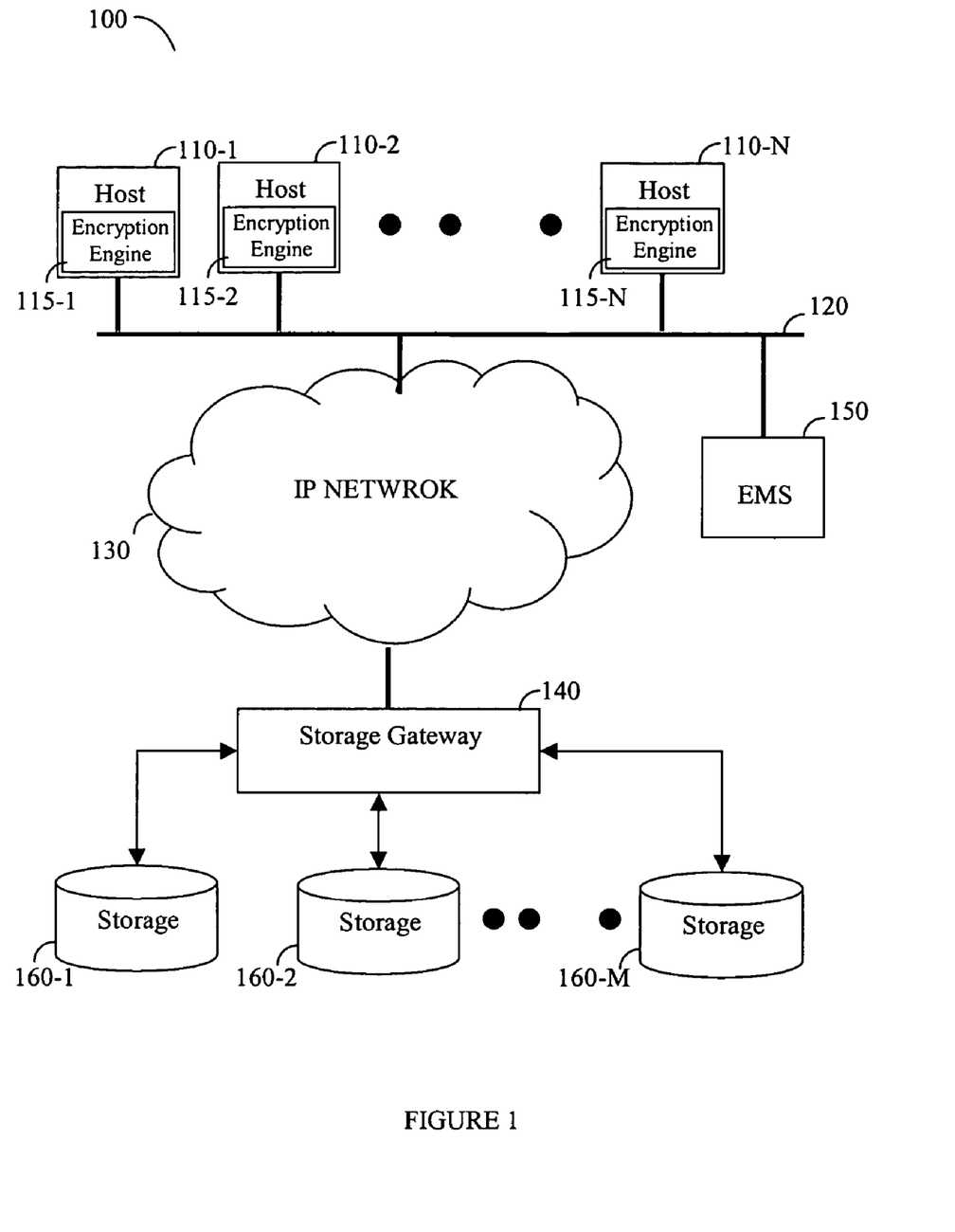
FIG. 1—is an exemplary storage network system describing the principles of the present invention FIG. 2—is a non-limiting flowchart describing the method for writing secured data to a remote site in accordance with an exemplary embodiment of the present invention FIG. 3—is a non-limiting flowchart describing the method for reading secured data from a remote site in accordance with an exemplary embodiment of the present invention FIG. 4—is a non-limiting flowchart describing the method for performing a disk block shuffling in accordance with an exemplary embodiment of this present invention FIG. 5—is an exemplary diagram illustrating the mapping function

Referring to FIG. 1, an exemplary storage network system 100 describing the operation of the present invention is shown. System 100 consists of a plurality of host computers 110-1 through 110-N connected within a local area network (LAN) 120, IP network 130, storage gateway 140, an encryption management station (EMS) 150, and a plurality of storage devices 160-1 through 160-M. In one configuration, hosts 110 may be connected to separate LANs 120, i.e., each group of host computers 110 may be connected to a different LAN 120. Such LAN 120 loops may be connected to each other by communication means, including but not limited to IP network 130. IP network 130 may be, but is not limited to, a private IP network, a shared public IP network, a shared private IP network, or a virtual private network (VPN). Hosts 110 communicate with storage devices 160 using the iSCSI protocol. Specifically, a host 110 sends a SCSI commands to a target storage device 160 over the IP network 130. A SCSI command refers to storage devices 160 as logical units (LUs), each identified by a logical unit number (LUN).

Storage gateway 140 is connected to IP network 130 and to storage devices 160 through a storage bus, such as a SCSI bus or a fibre channel. Storage gateway 140 receives encapsulated SCSI commands and data from hosts 110, decapsulates the commands and transfer the raw data to the target storage device 160. After the complete execution of the command, storage gateway 140 sends status information, or data, back to the initiator host 110 over IP network 130. A typical SCSI command results in a command phase, data phase, and a response phase. The command phase, a descriptor block (CDB) that embodies the SCSI command is transmitted. In the data phase, information travels either from the host (is usually referred to as "initiator") to the target (e.g., a WRITE command), or from the target to the initiator host (e.g., a READ command). In the response phase, the target returns the final status of the operation, including any errors. A response signals the end of a typical SCSI command.

Storage gateway 140 may include more functionalities than simple connectivity. These functionalities are virtualization services include, but are not limited to, mirroring, remote mirroring over a slow link, snapshot, data replication, striping, concatenation, periodic local and remote backup, restore, and the others. Virtualization essentially means mapping of a virtual volume address space to an address space on one or more physical storage target devices. A virtual volume can be anywhere on one or more physical storage devices 160. Each virtual volume consists of one or more virtual volumes or/and one or more LUs. Each LU, and hence each virtual volume, is generally comprised of one or more contiguous partitions of storage space on a physical device. Thus, a virtual volume may occupy a whole storage device, a part of a single storage device, or parts of multiple storage devices. The physical storage devices, the LUs and their exact locations, are transparent to the user. The operation of virtualization switch 110 is further disclosed in U.S. patent application Ser. No. 10/694,115 entitled "A Virtualization Switch and Method for Performing Virtualization in the Data-Path" assigned to common assignee and which is hereby incorporated for all that it contains.

System 100 allows saving of secure data in storage devices 160, by encrypting and decrypting the data in hosts 110 through the use of an encryption engine 115. Encryption engine 115 may be implemented in hardware, software, firmware, or combination thereof. The encryption in performed using an encryption key and an appropriate encryption algorithm. The encryption algorithms include, but are not limited to, data encryption standard (DES), 3DES, advanced encryption standard (AES), and others. The encryption key may be set a-priori to hosts 110. System 100 is configured so that only encrypted data moves from hosts 110 to storage devices 160, and vice versa. Since hosts 110 are connected to LAN 120, each of hosts 110 may read the encrypted data from storage devices 160. Hence, the encryption key (or keys) must be shared between hosts 110 to allow them to decrypt the data properly. To facilitate key sharing, EMS 150 maintains a key mapping table (KMT) that includes two entries, Target LU and Key. Each record in the KMT is associated with a single data block saved in storage devices 160. EMS 150 distributes the KMT between hosts 110 over a secured or an unsecured link. The secured link may be physically protected or protocol protected. In one embodiment, EMS 150 saves the KMT in a management space allocated in one of storage devices 160. The management space may also be saved in a mirror site and encrypted with a secret encryption key.

Figure 2:
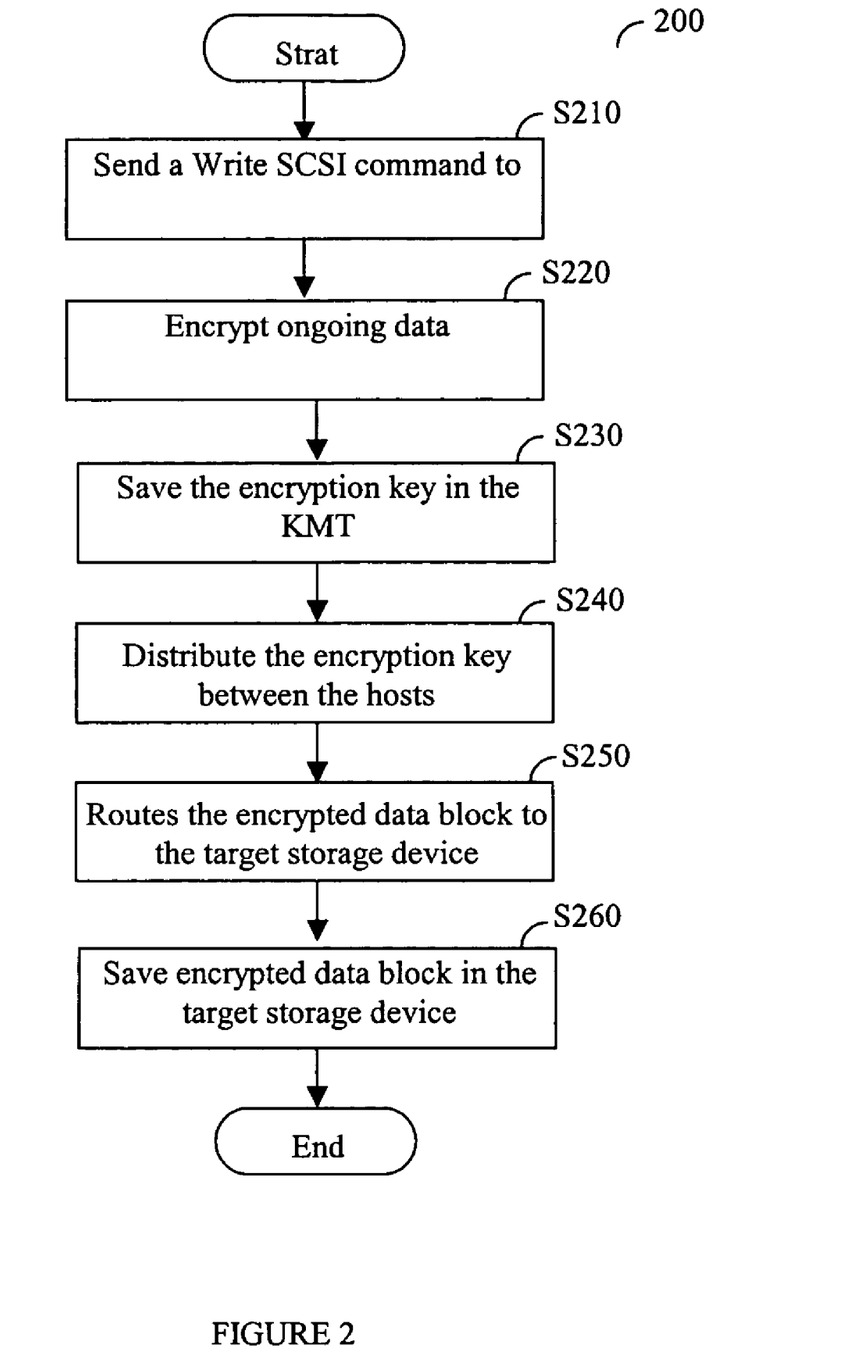

Referring to FIG. 2, a non-limiting flowchart 200 describing the method for writing secured data in a remote site, through network system 100, in accordance with an exemplary embodiment of the present invention, is shown. The data to be saved in storage device 160 is encrypted by encryption engine 115 installed in each of hosts 110. The encryption is performed on the host side to ensure that only secured data travels through network system 100. The encryption is performed at the block level, namely each data block is encrypted using a different encryption key. At step S210, a Write SCSI command is sent from an initiator host to storage gateway 140. The Write command includes at least the target LU and an address designating the destination location of the data block. At step S220, the data block to be written is encrypted with a private encryption key K and a predefined encryption algorithm. At step S230, the private encryption key K used to encrypt the data is saved in the KMT, which is kept in EMS 150. The KMT can be further saved in management space allocated in storage device 160 and optionally in a mirror site. At step S240, the private encryption key K is distributed to all other hosts 110 that may access this data block. The private encryption key K is sent to hosts 110 by EMS 150 as described in greater detail above. At step S250, storage gateway 140 routes the outgoing data block to the target LU identified using the LUN designated in the SCSI command. If storage gateway 140 supports virtualization, the LU may be a virtual volume and the address designated in the command is a virtual address. In such a case, the virtual address is converted to a physical address or a list of physical addresses. At step S260, the encrypted data is saved in the storage device 160 to a location designated by physical address.

Figure 3:
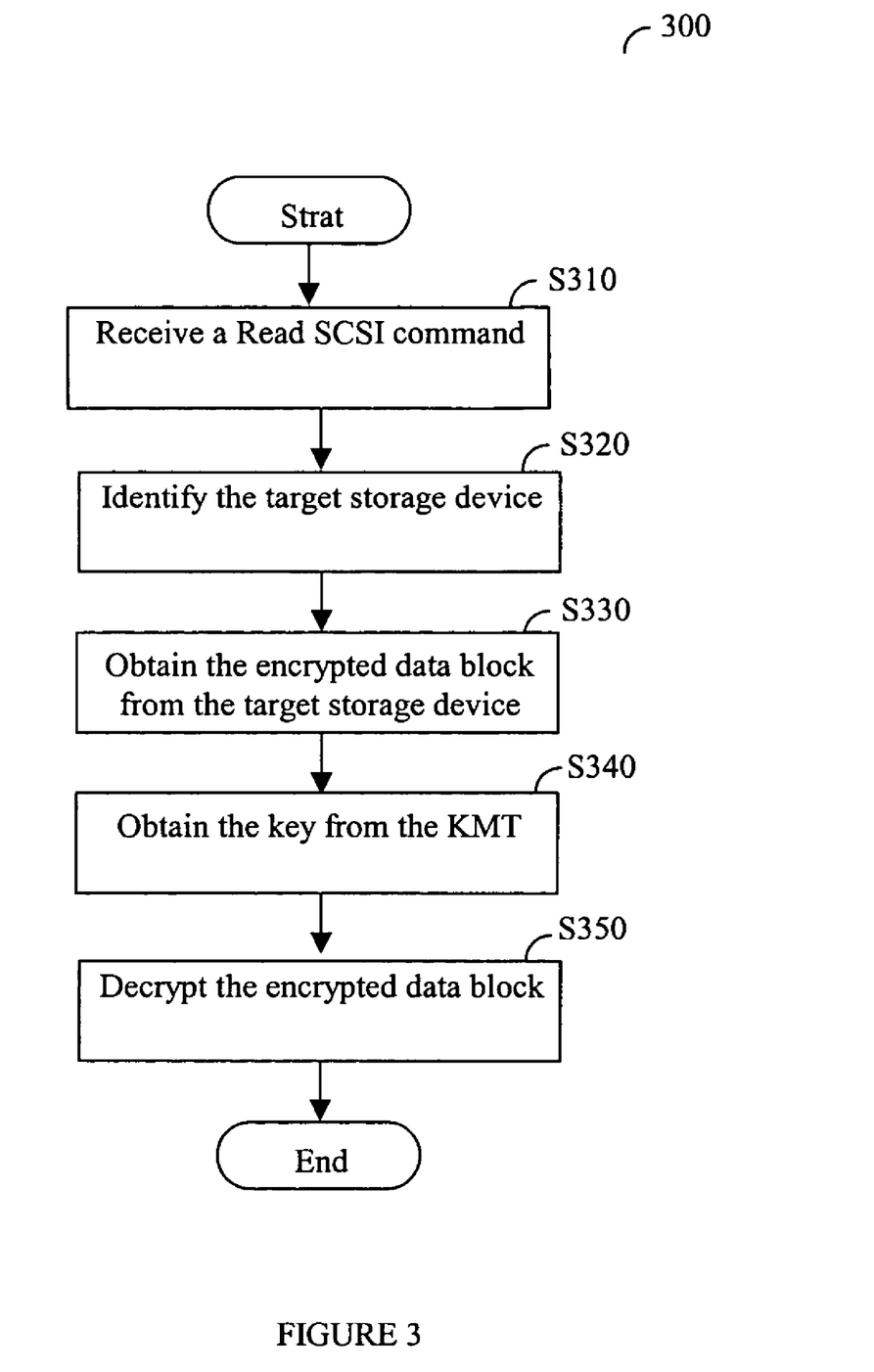

Referring to FIG. 3, a non-limiting flowchart 300 describing the method for reading secured data from a remote site, through network system 100, in accordance with an exemplary embodiment of the present invention, is shown. At step S310, a read SCSI request is sent from and initiator host to storage gateway 140. The read request includes at least the LUN and the address designating the location of the requested data block. At step S320, storage gateway 140 identifies the target LU according LUN designated in the SCSI command. If storage gateway 140 supports virtualization, the LU may be a virtual volume and the address designated in the command is a virtual address. In such a case, the virtual address is converted to a physical address or a list of physical addresses. At step S330, the requested data block is retrieved from the target LU, i.e., in the storage device 160 in a location designated by physical address. Subsequently, the retrieved data block is sent to the initiator host 110. At step S340, the private encryption key K used to encrypt the data is obtained from the KMT. The retrieved data block was encrypted using an encryption private key K prior to its saving in storage device 160. At step S350, the retrieved data block is decrypted using the private encryption key K and the appropriate decryption algorithm. The data decryption is performed at the block level, namely each block is decrypted using a different encryption key.

Figure 4:
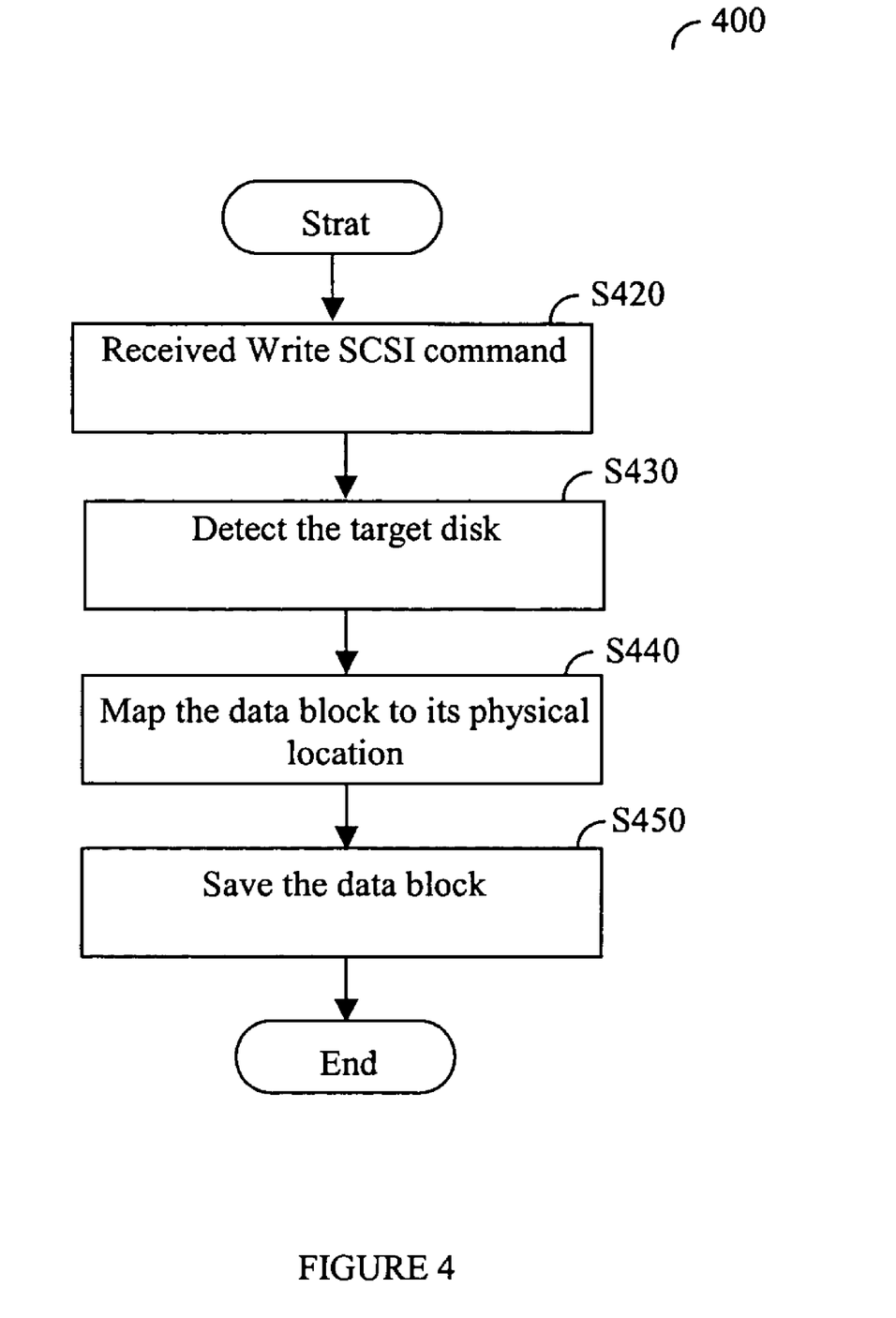

Referring to FIG. 4, a non-limiting flowchart 400 describing the method for performing a disk block shuffling, in accordance with an exemplary embodiment of the present invention, is shown. The block shuffling process breaks the file system structure and saves only raw data, i.e., no file system metadata is associated with the encrypted data. The disk block shuffling is based on writing the data block in a random place over the disk. The data placement is set by a mapping function or mapping functions, each associated with a different disk drive. At step S410, a write SCSI command together with the data block is sent from an initiator host to storage gateway 140. At step S420, storage gateway 140, identifies the target LU, i.e., the target storage device 160 using the LUN designated in the command. At step S430, storage gateway 140 shuffles the block order in the target storage device 160. Specifically, storage gateway 140 saves the data block in a physical location different from its original location in the storage device 160. The new location is determined according to a mapping function, which may be different from one storage device 160 to another. The mapping function and process used for shuffling data blocks are described in greater detailed below. At step S440, the data block is saved to its new physical location as determined by the mapping function.

Figure 5:
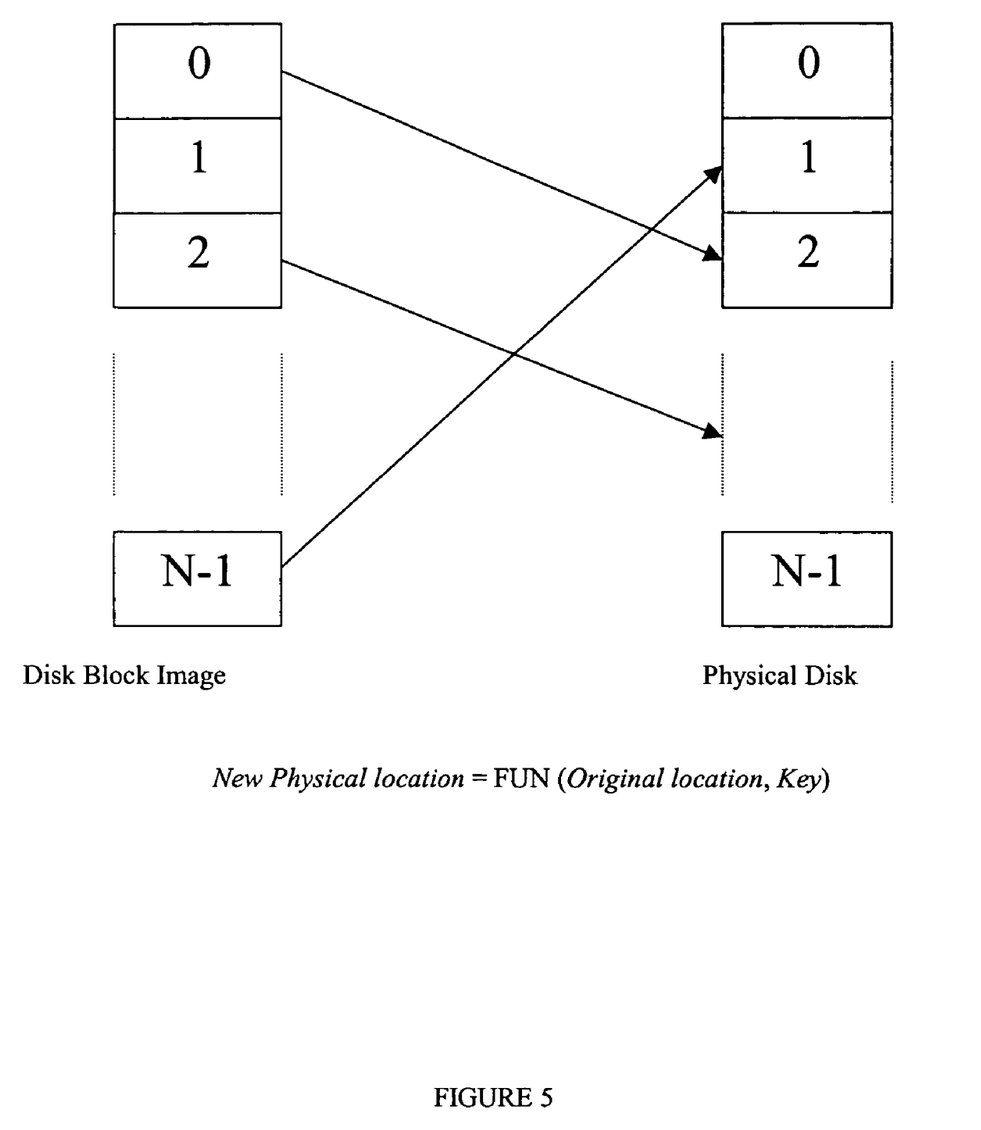

FIG. 5 shows an exemplary and non-limiting diagram that illustrates the mapping process. As can be seen in FIG. 5 block number '0' is saved in the place of block number '2' and block number 'N−1' is saved in the place of block number '1', in the physical disk. A mapping function may be of the form:

$$\text{Physical Location} = \text{fun}(\text{Original Location}, \text{key})$$

for example:

$$\text{fun}(\text{Original Location}, \text{key}) = (p \cdot \text{Original Location} + r) \mod N;$$

where, N is the number of blocks in the disk and N and p are prime numbers, i.e., the greatest-common-denominator (gcd) of the number N and p is 1. In this exemplary mapping function, the parameters p and r are the "keys". The original location represents the block number. This mapping function is just one example. Of course, other functions or tables may be used for this purpose.

A person skilled in the art would note that shuffling the block order in the disk makes it practically impossible for an unauthorized user to read the disk content without knowing the mapping function. It should be further noted that the data blocks may be encrypted by initiator host 110 or by storage gateway 140, prior to the shuffling process taking place.

In accordance with an embodiment, the present invention can be utilized to detect any modifications done in the stored data. In this embodiment, EMS 150 saves, in the allocated management space, the timestamps and the checksums for each stored data block. The timestamp and checksum signatures may be encrypted. An initiator host 110 upon reading the data block from the target storage device 160, compares the block signature with the timestamp and the checksum signatures saved in the management space. If the comparison results in an inequity, then the stored data was modified by an unauthorized user. EMS 150 may read and write data to the management space, while hosts 110 are permitted only to read data from the management space.

What is claimed:

1. A method for securing data by performing block level encryption, comprising:
   receiving at a host a write small computer system interface (SCSI) command, said write SCSI command including at least a data block and a location in a storage device into where said block is to be written to;
   encrypting at the host said data block using a private encryption key, wherein the encrypted data block is transmitted from said host to a storage device over a distributed storage network;
   saving said private encryption key associated with said data block in a key management table (KMT); and,
   distributing said private encryption key to other hosts having an access to the encrypted data block.

2. The method of claim 1, further comprising:
   saving the encrypted data block in said storage device to said location designated in said write command.

3. The method of claim 1, wherein said distributed storage network is at least one of: storage area network (SAN), network attached storage (NAS).

4. The method of claim 1, wherein said storage device is at least one of: tape drive, optical drive, disk, sub-disk, redundant array of independent disks (RAID).

5. The method of claim 1, wherein encrypting said data block is performed by means of at least one of the following encryption algorithms: data encryption standard (DES), 3DES, advanced encryption standard (AES).

6. The method of claim 1, wherein said KMT is saved in an encrypted management space allocated within a storage device.

7. The method claim 1, wherein distributing said KMT between said hosts comprises the step of: sending said KMT to said hosts over a secured link.

8. The method of claim 1, wherein said KMT comprises a target entry and a key entry, said target entry including a logical unit number (LUN) corresponding to said storage device, and said key entry including said private encryption key.

9. The method of claim 8, wherein each record in said KMT is associated with said encrypted data block.

10. A computer executable code for securing data by performing block level encryption, said code comprising:
    receiving at a host a write small computer system interface (SCSI) command, said write SCSI command including at least a data block and a location in a storage device into where said block is to be written to;
    encrypting at the host said data block using a private encryption key, wherein the encrypted data block is transmitted from said host to a storage device over a distributed storage network;
    saving said private encryption key associated with said data block in a key management table (KMT); and,
    distributing said private encryption key to other hosts having an access to the encrypted data block.

11. The computer executable code of claim 10, further comprising:
    saving the encrypted data block in said storage device to a location designated in said write command.

12. The computer executable code of claim 10, wherein said distributed storage network is at least one of: storage area network (SAN), network attached storage (NAS).

13. The computer executable code of claim 10, wherein said storage device is at least one of: tape drive, optical drive, disk, sub-disk, redundant array of independent disks (RAID).

14. The computer executable code of claim 10, wherein encrypting said data block is performed by means of at least one of the following encryption algorithms: data encryption standard (DES), 3DES, advanced encryption standard (AES).

15. The computer executable code of claim 10, wherein said KMT is saved in an encrypted management space allocated within a storage device.

16. The computer executable code claim 10, wherein distributing said KMT between said hosts comprises the step of: sending said KMT to said hosts over a secured link.

17. The computer executable code of claim 10, wherein said KMT comprises a target entry and a key entry, said target entry including a logical unit number (LUN) corresponding to said storage device, and said key entry including said private encryption key.

18. The computer executable code of claim 17, wherein each record in said KMT is associated with said encrypted data block.

19. A method for securing data by performing block level decryption of previously encrypted data blocks, said comprising:
   receiving at a host a read small computer system interface (SCSI) command, said read SCSI command including at least an address of an encrypted data block to be read from a storage device;
   retrieving said encrypted data block from said storage device;
   sending said encrypted data block to said host, wherein said encrypted data block is transmitted from said storage device to said host over a distributed storage network;
   retrieving from a keys management table (KMT) a private encryption key associated with said encrypted data block; and,
   decrypting at the host said encrypted data block using said private encryption key.

20. The method of claim 19, wherein said distributed storage network is at least one of: storage area network (SAN), network attached storage (NAS).

21. The method of claim 19, wherein said storage device is at least one of: tape drive, optical drive, disk, sub-disk, redundant array of independent disks (RAID).

22. The method of claim 19, wherein encrypting said data block is performed by means of at least one of the following encryption algorithms: data encryption standard (DES), 3DES, advanced encryption standard (AES).

23. The method of claim 19, wherein said KMT is saved in an encrypted management space allocated in a storage device.

24. The method of claim 19, wherein said KMT comprises a target entry and a key entry, said target entry including a logical unit number (LUN) corresponding to said storage device, and said key entry including said private encryption key.

25. A computer executable code for securing data by performing block level decryption of previously encrypted data blocks, said code comprising:
   receiving at a host a read small computer system interface (SCSI) command, said read SCSI command including at least an address of an encrypted data block to be read from a storage device;
   retrieving said encrypted data block from said storage device;
   sending said encrypted data block to said host, wherein said encrypted data block is transmitted from said storage device to said host over a distributed storage network;
   retrieving from a keys management table (KMT) a private encryption key associated with said encrypted data block; and,
   decrypting at the host said encrypted data block using said private encryption key.

26. The computer executable code of claim 25, wherein said distributed storage network is at least one of: storage area network (SAN), network attached storage (NAS).

27. The computer executable code of claim 25, wherein said storage device is at least one of: tape drive, optical drive, disk, sub-disk, redundant array of independent disks (RAID).

28. The computer executable code of claim 25, wherein encrypting said data block is performed by means of at least one of the following encryption algorithms: data encryption standard (DES), 3DES, advanced encryption standard (AES).

29. The computer executable code of claim 25, wherein said KMT is saved in an encrypted management space allocated in a storage device.

30. The computer executable code of claim 25, wherein said KMT comprises a target entry and a key entry, said target entry including a logical unit number (LUN) corresponding to said storage device, and said key entry including said private encryption key.

31. A method for securing data by performing data shuffling, comprising:
   a) receiving at a host a write small computer system interface (SCSI) command together with a data block and an original location indicating the destination of said data block;
   b) applying at the host a mapping function for the purpose of determining a new location for said data block; and,
   c) writing said data block to said new location.

32. The method of claim 31, wherein writing said data block further comprising: encrypting at the host said data block.

33. The method of claim 31, wherein said mapping function determines said new location according to said original location and a secret key.

34. The method of claim 31, wherein said data block is transmitted from said host to said storage device over a distributed storage network.

35. The method of claim 34, wherein said distributed storage network is at least one of: storage area network (SAN), network attached storage (NAS).

36. The method of claim 34, wherein said storage device is at least one of: tape drive, optical drive, disk, sub-disk, redundant array of independent disks (RAID).

37. A computer executable code for securing data by performing data shuffling, said code comprising:
   receiving at a host a write small computer system interface (SCSI) command together with a data block and an original location indicating the where to save said data block;
   applying at the host a mapping function for the purpose of determining a new location for said data block; and,
   writing said data block to its said new location.

38. The computer executable code of claim 37, wherein writing said data block further comprising: encrypting at the host said data block.

39. The computer executable code of claim 37, wherein said mapping function determines said new location according to said original location and secret key.

40. The computer executable code of claim 37, wherein said data block is transmitted from said host to said storage device over a distributed storage network.

41. The computer executable code of claim 40, wherein said distributed storage network is at least one of: storage area network (SAN), network attached storage (NAS).

42. The computer executable code of claim 40, wherein said storage device is at least one of: tape drive, optical drive, disk, sub-disk, redundant array of independent disks (RAID).

43. A host computer for the purpose of securing data by performing block level encryption, said host computer comprising at least:
- an encryption engine;
- a decryption engine;
- a host initiator;
- a connection to a network, the network being coupled to at least a storage gateway;
- means for receiving a write small computer system interface (SCSI) command from the host initiator, said write SCSI command including at least a data block and a location in a storage device into where said block is to be written to;
- means for saving a private encryption key associated with said data block in a key management table (KMT); and,
- means for distributing said private encryption key to other hosts having an access to said data block.

\* \* \* \* \*